United States Patent [19]

Okuda

[11] 4,277,048
[45] Jul. 7, 1981

[54] HYDRAULIC ACTUATOR WITH AUTOMATIC TRAVEL LIMIT BYPASS

[76] Inventor: Genzaburo Okuda, 263-banchi Tanjo Mihara-cho, Minamikawachi-gun Osaka-pref, Japan

[21] Appl. No.: 69,508

[22] Filed: Aug. 24, 1979

[30] Foreign Application Priority Data

Aug. 28, 1978 [JP] Japan .................... 53/117511[U]

[51] Int. Cl.³ ............................................. B66F 3/24
[52] U.S. Cl. .................................. 254/8 B; 254/2 B; 91/401
[58] Field of Search ................ 91/401, 402; 259/8 B, 259/2 B, 93 R, 93 H

[56] References Cited

U.S. PATENT DOCUMENTS

| | | | |
|---|---|---|---|
| 3,347,049 | 10/1967 | Fattersack et al. | 254/93 R X |
| 3,890,684 | 6/1975 | Tallman | 254/93 H X |
| 3,967,814 | 7/1976 | Leibundgut | 254/8 B |

Primary Examiner—Robert C. Watson
Attorney, Agent, or Firm—Fisher, Christen & Sabol

[57] ABSTRACT

A hydraulically operated lifting device, such as a portable swinging-arm floor jack a low-rise forklift, or a high-rise forklift is provided with a piston-and-cylinder actuator having a closure member at one end of the cylinder through which a bore extends which supports a piston of the desired length and which is of uniform diameter throughout. The closure member has a radial bypass opening to a central point of the bore which communicates with a reservoir surrounding the cylinder and the inner end of the piston is provided with a passage which communicates with the bypass opening at the outer travel limit of the piston to recirculate fluid to the reservoir to prevent further pressure build-up. The bore includes fluid seals on each side of the bypass opening to prevent fluid leakage.

8 Claims, 7 Drawing Figures

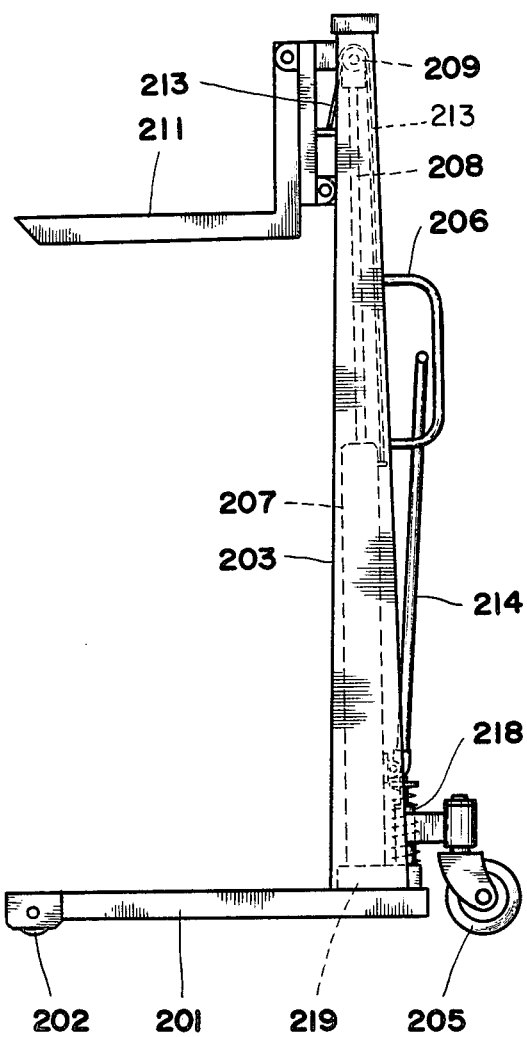
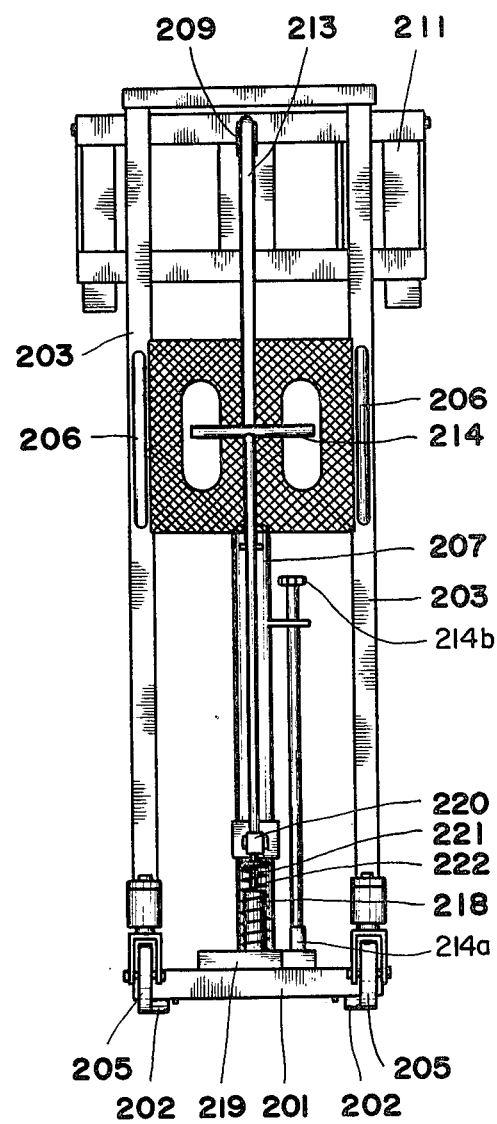

HYDRAULIC ACTUATOR WITH AUTOMATIC TRAVEL LIMIT BYPASS

BACKGROUND OF THE INVENTION

The present invention relates to hydraulic lifting equipment such as a portable floor jack of the type having a swinging lift arm, used in automobile repair shops; and forklift trucks of the manually operated type having a low-rise or a high-rise lifting capacity.

One object of the invention is to provide a piston-and-cylinder arrangement for the foregoing types of lifting apparatus in which a passage is provided at the inner end of the piston which communicates with a bypass opening in the bore supporting the piston only when the piston has reached its limit of travel. The bypass opening communicates with the hydraulic fluid reservoir so that when the piston has reached its limit of movement, further operation of the fluid has no effect on the piston, but merely cycles the fluid through the passage in the piston, the bypass opening and back into the reservoir. Annular fluid seals are installed in the bore on both sides of the bypass opening so that fluid does not enter the opening when the piston is at any intermediate point in its travel and cannot leak out of the bore when fluid is being bypassed at the outer end of piston travel.

Such an arrangement eliminates the necessity for providing a complex movable valve mechanism on the inner end of the piston, such as is shown in U.S. Pat. No. 3,404,868, or a spring operated bypass valve mechanism such as is shown in U.S. Pat. No. 3,907,252. The mechanism in these prior patents require the use of movable elements and additional springs which can malfunction after repeated use and, in any event, add to the cost of fabrication.

Another object of the invention is to provide a piston-and-cylinder actuator for lifting devices in which only a short length of the cylinder is machined to closely fit the piston. The length of the piston itself may greatly exceed the length of the bore itself, the remainder of the cylinder comprising a chamber which surrounds the piston when retracted but in outwardly spaced relationship to it, whereby the inner surface of that enlarged portion of the cylinder need not be carefully machined to the same tolerances as would be otherwise required.

A further object which is achieved by the aforementioned design is that by eliminating the necessity for a radial flange at the inner end of the piston it can be inserted into the bore of the cylinder from the outside and by having an internal passage which cooperates with a bypass opening in the bore, there is no danger that the piston will be later displaced from the cylinder, as a result of continued pumping of hydraulic fluid and regardless of the fact that there is no physical obstacle preventing its removal.

Another object of the invention is to provide a closure member for one end of a double walled tubular chamber, the inner tubular element comprising a cylinder for an actuator piston and the outer tubular element defining with the first element a reservoir for hydraulic fluid for actuating the piston. The closure member is provided with a central bore to receive the actuator piston and the bore includes a radial bypass opening for communication with the space between the tubular elements. The piston is provided with a bypass passage to communicate with the opening when projected to the full length and, because it may be of uniform diameter along its entire length, the same closure member may be combined with tubular elements of any length corresponding with the length of piston necessary to provide the desired length of travel for the apparatus in question.

The application discloses, but is not limited to, a closure member of the type described for cylinder and piston actuating a portable floor jack wherein the piston travel is relatively short; and two types of manually operated forklifts in which the piston travel is of varyingly greater extent in each case.

Other objects and advantages would be apparent to those skilled in the art after reading the following description in connection with the annexed drawings.

BRIEF DESCRIPTION OF THE DRAWINGS

FIG. 5 is a side elevation of a high-rise forklift embodying the invention;

FIG. 6 is an end elevation of the forklift of FIG. 5, and;

DETAILED DESCRIPTION OF THE INVENTION

Figure 1:
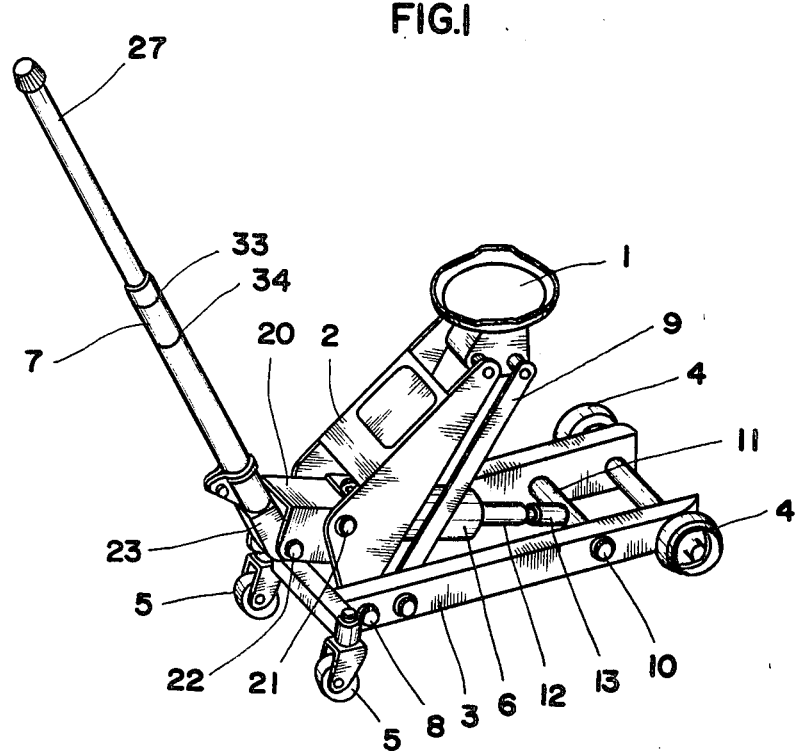
FIG. 1 is a perspective view of a preferred form of lifting jack according to the present invention.

In the drawings, numeral 1 indicates a saddle which is brought into contact with the bottom of a load to be lifted, such as the frame or axle of an automobile. The saddle is pivotally connected to the extremity of a lifting arm 2. Numeral 3 indicates a generally rectangular frame having a pair of fixed axle front wheels 4 and a pair of swivelling caster wheels 5 at the rear to allow for guiding the jack frame is various directions. Numeral 6 designates a lifting cylinder and numeral 7 designates a handle for operating the cylinder and guiding the frame 3. The lifting arm 2 is supported at its lower end by a pair of pins 8 mounted in the side members of the frame. In addition, stabilizing arms is pivotally connected between the side members of the frame and the saddle 1 parallel with the long axis of lifting arm 2 for keeping the saddle in horizontal position regardless of the position of the lifting arm.

A tubular member 11 is pivotally supported upon a shaft 10 which extends between the side members near the front of frame 3, and a rod-like piston 12 has one end extending into the interior of cylinder 6 through a short bore 17a with its other end supported by the socket 13 on the exterior of tubular member 11. A transverse member 14, provided with interior oil passages, closes the open end of cylinder 6 and also forms one end of an annular oil supply reservoir 15 which surrounds cylinder 6. The inner end of piston 12 is provided with an L-shaped oil passage, one end of which opens on the interior face of the piston for communication with the interior of cylinder 6, while the other end opens at the side of the piston for communication with a bypass opening 17 in the wall of the bore which supports the piston, when the piston is at its most projected position in the bore, so that any further pumping of oil into cylinder 6 at this point, merely causes it to flow through L-shaped passage 16, and bypass 17 into the reservoir 15 without pushing the piston any further.

The transverse closure member 14 also supports a small reciprocating oil pump 18 and a pressure release valve 19, these devices being protected by a cover 20 supported by closure 14 and extending in a direction away from reservoir 15, whereby the lifting arm 2, which straddles cover 20 can be pivotally connected to it by means of pin 21, located at a short distance from the lower mountings 8 for the arm. A holder 23 for the lower end of handle 7 is also pivotally attached to the open end of cover 20 by means of pin 22, while the lower end of the holder 23 supports a pump operating roller 24 below the pivot 22. The roller 24 is arranged for operational contact with the enlarged head of the projecting end of piston 25 of pump 18 while coil spring 26 exerts force on the head of the piston to maintain contact with roller 24. At the upper end of handle 7 there is a rotatable upper section 27 which is connected, to a socket having a shaft 28 projecting downwardly from the bottom of the handle 7 which is connected by a double universal jointed member 29 to rotate the pressure release valve 19 when section 27 is rotated.

Figure 2:
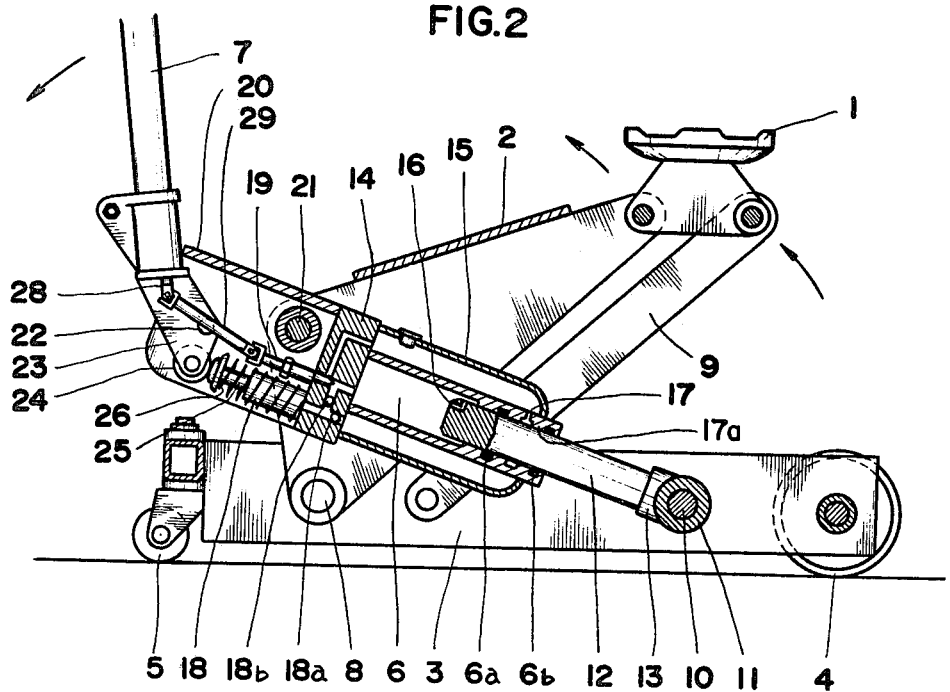
FIG. 2 is a cross-sectional elevation of the jack of FIG. 1.

As shown in FIG. 2, the closure member 14 is provided with interior passages which communicate between opening 17 the pressure differential between the interior of cylinder 6 and the interior of reservoir 15 drops to zero and no further outward movement of the cylinder can take place. Also once the inner radial opening of passage 16 has passed beyond the oil seal 6a, the oil seal 6b will prevent any leakage of fluid from the exterior end of the bore 17a.

In this connection it should be noted that by using a cylinder 6 which is of substantially greater diameter than piston 12 over a major portion of its length, there is no necessity for smoothly finishing the interior surface of this portion of the cylinder. Only the short length of the bore 17a, provided with oil seals 6a and 6b needs to be machined to the precise diameter of the piston and this results in a considerable saving in costs.

When it is desired to lower the raised lifting arm the upper section 27 of the handle is rotated to open the pressure relief valve 19 which allows oil to flow back from cylinder 6 into reservoir 15, and the lifting arm 2 and cylinder 6 return to their original positions with the piston 12 fully returned into the cylinder.

Figure 3:
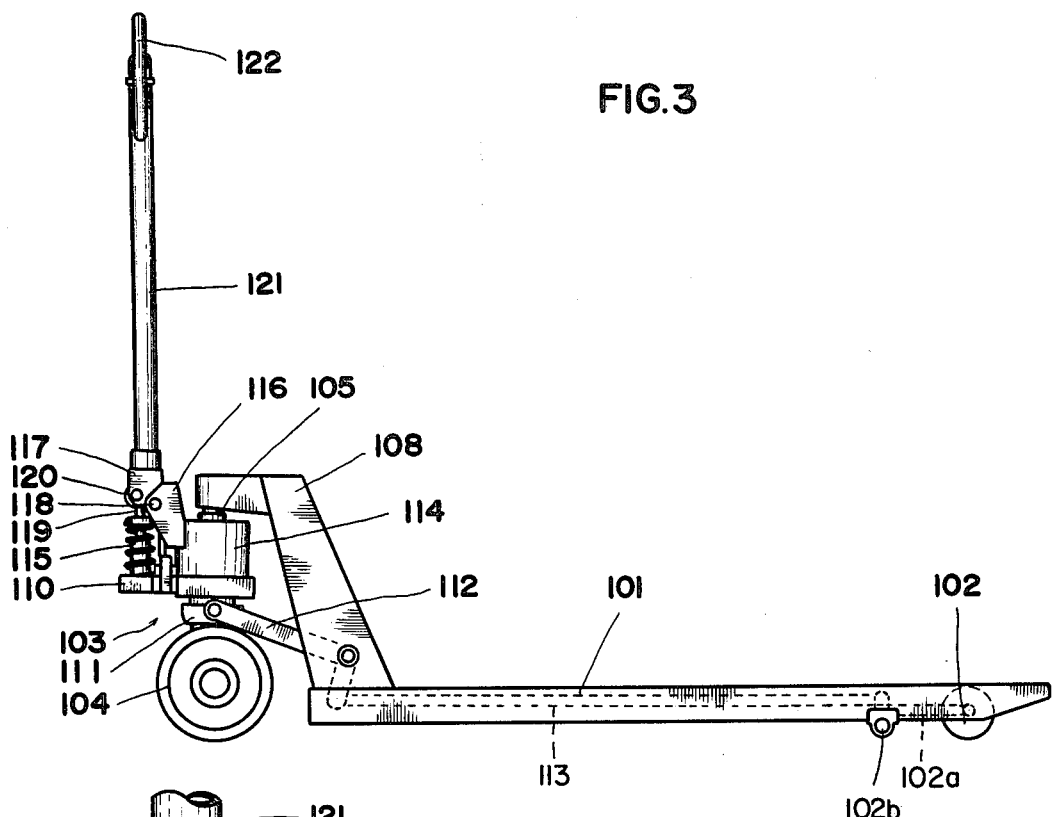
FIG. 3 is a side elevation of a low-rise forklift embodying the piston-and-cylinder arrangement of the invention.
Figure 4:
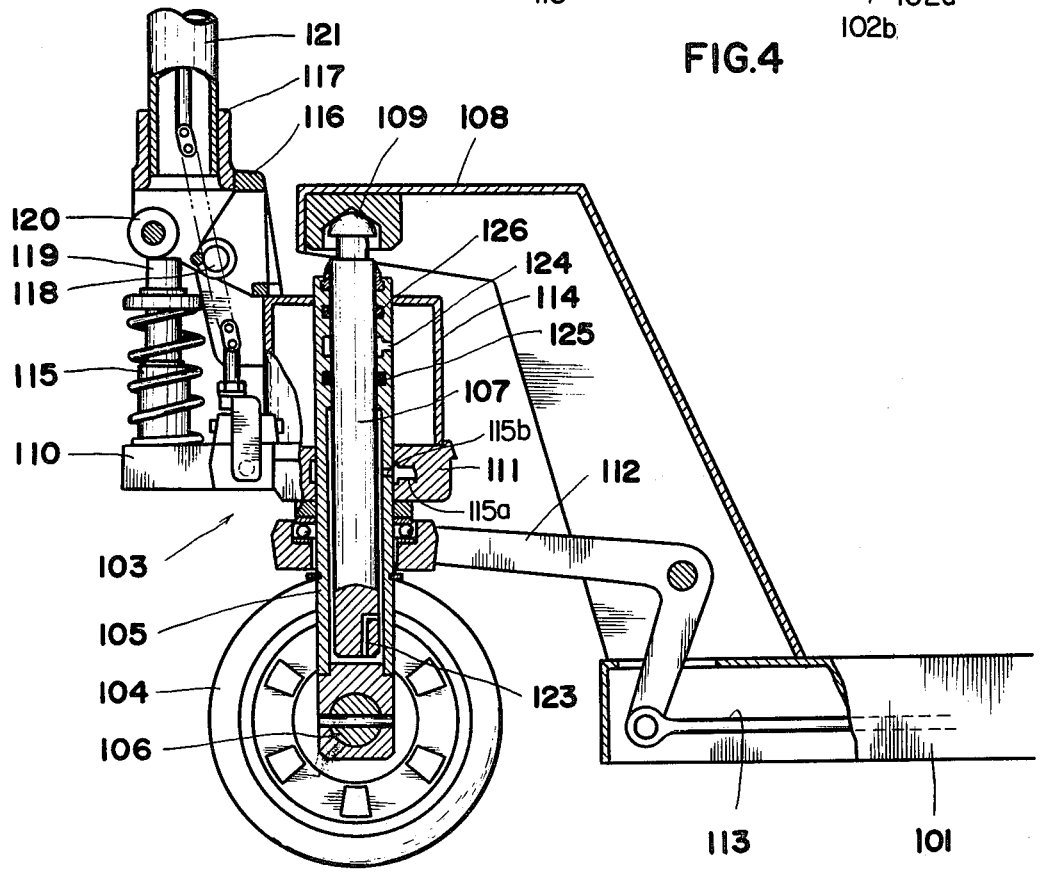
FIG. 4 is a fragmentary cross-section of the elevating mechanism of FIG. 4 but on an enlarged scale.

Another application of the previously described cylinder-and-piston arrangement for use in a low-rise forklift device, is shown in FIGS. 3 and 4 wherein numeral 101 indicates one of a pair of inverted-channel shaped parallel arms joined together at one end so as to capable of insertion beneath a conventional load-carrying pallet, by the bearing 111 with the result that rod 113 moves to the right to rotate lever 102a in a clockwise direction which moves the rollers 102 downwardly to raise the front ends of arms 101 the same amount as the rear frame-work 108.

Figure 7:
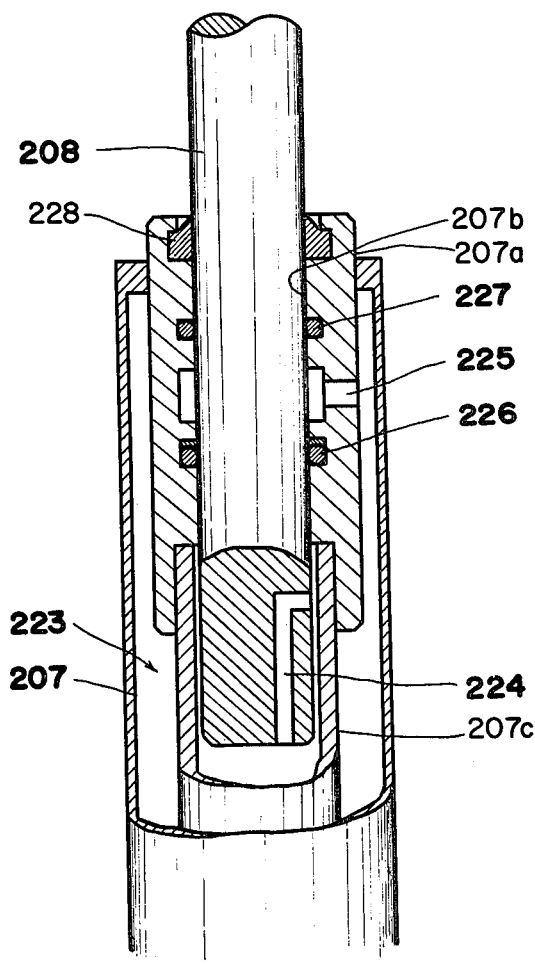
FIG. 7 is a fragmentary cross-section, on an enlarged scale, of the closure emeber for the hydraulic actuator shown in FIGS. 5 and 6.

A form of high-rise forklift truck is shown in FIGS. 5–7, in which a horizontal base member 201 is provided with a pair of front wheels 202, mounted on fixed axes, and a pair of swivelling rear wheels 205. A pair of parallel vertical pedestals 203 are mounted at the rear of the base and are provided with handles 206 for maneuvering the vehicle from one location to another. A tubular column 207, secured at its lower end to a mounting member 219 attached to the base 201, extends upwardly between the pedestals 203 to a level approximately one half the height of the pedestals. Closing the upper end of column 207 is an elongated closure member 207a provided with an axially extending bore 207b which receives a long piston rod 208, as can be seen in FIG. 7. Connected to the lower end of member 207a and extending downwardly to the mounting member 219 is a cylinder 207c whose inner diameter may be slightly larger than that of the bore 207b. Supported at the upper end of the piston 208 is a pulley 209 over which passes a lifting chain, or cable, 213. One end of this chain is secured to the tubular column 207, while the other end is attached to a forklift cradle 211 which is vertically slidably mounted on the pedestals 203.

A plunger type pump 218 is mounted on the member 219 and an elongated pump operating handle 214 is pivotally mounted at 220 on column 207 in such a way that swinging movement of the handle will reciprocate the piston 221 of the pump 218 in opposition to spring 222. A system of conduits (not shown) similar to those disclosed in connection with the first two embodiments of the invention connects the plunger pump 218 with the bottom interior of the cylinder 207c and also the space 223 between the cylinder and column 207 so that repeated swinging movement of handle 214 will draw hydraulic fluid from the reservoir defined by the annular space 223 into the lower end of cylinder 207c to force the piston 208 in an upward direction. This, in turn, causes the cradle 211 to be elevated as a result of the action of pulley 209 on chain 213. A manually operated valve 214a, controlled by an upstanding shaft provided with a conveniently located knob 214b, is connected by conduits (not shown) between the reservoir and cylinder to allow the operator to release fluid from cylinder 207c back into the space 223 when it is desired to lower cradle 211.

Turning now to FIG. 7, it may be seen that an L-shaped passage 224 extends between the lower end of piston 208 to a location in the cylindrical wall of the piston spaced from the end. It will also be seen that an annular recess, provided near the middle of the bore 207b, communicates through aperture 225 with the reservoir space 223 between the closure 207a and the tubular 207 so that when the piston 208 reaches a certain point in its upward movement any additional fluid pumped into cylinder 207c will flow direction through passages 224 and 225 directly into the reservoir and further upward movement of the piston is effectively stopped with any excess pressure being exerted on any of the elements of the hydraulic system, as is the case when pressure-operated overload valves are employed. Leakage of fluid from cylinder 207c is primarily prevented by a seal, such as the O-ring 226 during normal operation of the piston, and by the upper O-ring seal 227 when the piston has reached its upper limit of travel as described above, while a resilient dust seal 228 prevents dirt and dust from being carried downwardly into the hydraulic system when the piston is being lowered.

In each of the above described forms of the invention it will be seen that in each case the provision of a bypass passageway which communicates from the front end of the piston with an aperture in the piston cylinder wall at a certain point in the piston travel to automatically direct the hydraulic fluid from the interior of the cylinder back into the fluid reservoir there is thus provided an inexpensive overload protection system because, regardless of the amount and speed with which fluid is supplied by the plunger pump, it is impossible to move the piston beyond the point at which the bypass passage communicates with the aperture in the cylinder wall. Thus, it is not necessary to supply the inner end of the piston with a flange to limit outward movement, and it is not necessary to provide separate overload pressure valves for the fluid system or mechanically operated limit valves for bypassing fluid.

Another advantage provided by the invention is that only a short length of the chamber containing the piston needs to be machined for a close fit with the cylinder, with the bypass being provided in this short length of the bore and appropriate oil seals used on both sides of the bypass aperture to prevent leakage of oil. In addition, the piston itself is of uniform diameter throughout its length and, not requiring an inner flange, can be inserted directly into the piston from the outside of the cylinder.

Still another advantage of the invention resides in the fact that a short cylinder bore, such as the element 207a in FIG. 7 can be fabricated in quantities for use with any length of piston. For example, in FIG. 2 and in FIG. 4, the cylinders 6 and 105 are shown as comprising a single element having its major length of a rough-finished interior of greater diameter than the respective pistons 12 and 107 with a close-fitting bore at one end. However, the pistons of FIGS. 2 and 4 could just as well be assembled with their respective reservoirs 17 and 114 by combining appropriately dimensioned inner and outer tubular elements with the short bore element 207a of FIG. 7.

Other modifications and improvements made by which would come within the scope of the annexed claims.

I claim:

1. In a hydraulically operated lifting device of the type wherein load-supporting means is mounted for vertical movement on frame means, and cylinder-and-piston means is connected between the frame means and load-supporting means for effecting said vertical movement in response to hydraulic fluid intermittently supplied under pressure from reservoir means by pump means manually actuated by handle means mounted for swinging movement on said device, the improvement which comprises end wall means for the cylinder provided with a bore which slidably receives and wholly supported the piston for axial movement, said bore being provided with a bypass opening located medially of the ends of the bore and in communication with the fluid reservoir means, the piston being provided adjacent its inner end with a bypass for communication between the interior of the cylinder and the bypass opening at a predetermined position of the piston to limit further outward movement of the piston, and annular sealing means in said bore located axially on each side of the bypass opening.

2. The device of claim 1, wherein the inner end of said piston is of uniform diameter along its entire length.

3. The device of claim 1, wherein said cylinder comprises an elongated closed chamber, the inner diameter of said chamber being greater than the diameter of said piston along substantially all of its length.

4. The device of claim 3, wherein said closed chamber comprises a tubular element having an inside diameter greater than the diameter of said bore, one end thereof being closed by said end wall means, and said reservoir means comprises another tubular element spaced from and surrounding said first tubular element, one end of the second tubular element also being closed by said end wall means, said bypass opening being in communication with the space bewteen said two tubular elements.

5. The device of claim 4, wherein the length of said end wall means is independent of the length of the piston, said first tubular element having a length dependent upon the length of travel of the piston.

6. The device of any one of claims 1, 2, or 3, wherein said load-supporting means comprises an arm pivotally connected with a frame for vertical movement about a horizontal axis, said frame being mounted on wheels, and said handle being mounted for guiding the frame on a horizontal surface.

7. The device of any one of claims 1, 2, or 3, wherein said load-supporting means comprises fork means and said frame means comprises a plurality of ground-engaging wheels mounted on the fork means for raising and lowering the fork means.

8. The device of any one of claims 1, 2, 3, 4, or 5, wherein said load-supporting means comprises fork means mounted on frame means for vertical raising and lowering with respect to the frame means, said frame means being mounted on ground-engaging wheels.

* * * * *